United States Patent [19]

de Concini et al.

[11] Patent Number: 4,718,635

[45] Date of Patent: Jan. 12, 1988

[54] FUEL METERING VALVE FOR AN INTERNAL COMBUSTION ENGINE FEED DEVICE

[75] Inventors: Roberto de Concini, Zola Predosa; Pietro Busacchi, Bologna, both of Italy

[73] Assignee: Weber S.p.A., Turin, Italy

[21] Appl. No.: 843,145

[22] Filed: Mar. 24, 1986

[30] Foreign Application Priority Data

Mar. 22, 1985 [IT] Italy .............................. 53165/85[U]

[51] Int. Cl.⁴ ......................... F16K 31/06; F02M 51/06

[52] U.S. Cl. ........................... 251/129.18; 251/129.21; 239/585

[58] Field of Search ....................... 251/129.21, 129.18; 239/585

[56] References Cited

U.S. PATENT DOCUMENTS 3,502,105 3/1970 Ernyei et al. .............. 251/129.21 X
4,385,339 5/1983 Takada et al. ............. 251/129.21 X
4,477,027 10/1984 Knapp et al. .............. 251/129.21 X

FOREIGN PATENT DOCUMENTS 214717 6/1959 Austria ............................ 251/129.21

*Primary Examiner*—Arnold Rosenthal
*Attorney, Agent, or Firm*—Jeffers, Hoffman & Niewyk

[57] ABSTRACT

A fuel metering valve comprises a valving member mobile axially within a casing and operated by an electromagnet, with said valving member there being rigid an armature arranged for attraction by the core of the electromagnet, and an annular stop member being provided to act as a stop for said valving member and being interposed between a shoulder of said casing and the front surface of a nosepiece rigid with said casing and arranged to house said valving member; the stop member is provided, on that side facing said nosepiece, with at least two different flat surfaces, of which a first surface is arranged to form a stop for said valving member and a second surface is arranged to form a shoulder for said front surface of the nosepiece, said first and second surfaces being positioned each at a different distance from said casing shoulder.

5 Claims, 3 Drawing Figures

FUEL METERING VALVE FOR AN INTERNAL COMBUSTION ENGINE FEED DEVICE

BACKGROUND OF THE INVENTION

This invention relates to a fuel metering valve forming part of an internal combustion engine feed device. Devices of this type are arranged to deliver a predetermined quantity of fuel, which mixes with the air in the internal combustion engine feed manifold, and comprise substantially mixture forming means to which, by way of suitable ducts, air is fed together with predetermined quantities of fuel, this latter by means of the said metering valve.

This latter comprises substantially a casing in which a path is defined for the fuel which is fed to the valve by the action of a delivery pump, and a valving member which is mobile axially within the casing between a first position in which it makes contact with a suitable seat to close said path, and a second position in which said path is open. The valving member is operated by an electromagnet disposed in the casing, and is rigid with an armature which is attracted by the electromagnet core. In this casing there is disposed a ring to form a stop for the valving member when in its second aforesaid position. This ring is normally interposed between a casing shoulder and the front surface of a nosepiece which is rigid with the casing and houses the valving member.

This latter is retained in the first said position (closed position) by the action of a spring, whereas when the electromagnet is energised the valving member moves axially to open the fuel path until it stops against the said ring. In this second position, the residual space (residual air gap) remaining between the armature rigid with the valving member and the electromagnet core is usually very small. When the electromagnet energisation ceases, the valving member returns to its first position to close the fuel path.

Although valves of the described type operate satisfactorily, they give rise to certain difficulties during their assembly. To understand how such difficulties arise, it should be noted that the stroke through which the valving member travels in moving from the first to the second of the aforesaid positions and the residual space (residual air gap) between the armature and core in this second position must be adjusted in an extremely precise manner with a tolerance of only a few thousandths of a millimeter. Only if these conditions are satisfied can the fuel be precisely metered and the electromagnetic action of the electromagnet be applied correctly.

In valves of the indicated type, the stroke and air gap are adjusted in the following manner. The valve is initially assembled, and after assembly the stroke of the valving member and the air gap are measured with suitable tools. If these are incorrect, the valve is dismantled and the valving member stop ring is replaced, the thickness of this latter determining the air gap between the armature and core. To adjust the stroke of the valving member, a predetermined quantity of material is removed from the front surface of the nosepiece, facing said ring. This thus reduces the distance between said surface and the seat within the nosepiece against which the valving member rests when in its closed position, to thus vary the stroke of this latter.

When carried out in the aforesaid manner, the stroke and air gap adjustments not only require successive valve assembly and dismantling, but also require chip-forming machining on certain parts of the valve, and are therefore lengthy and costly, and require special care and ability.

SUMMARY OF THE INVENTION

An object of the present invention is to provide a fuel metering valve of the aforesaid type in which the said valving member stroke and air gap adjustments can be made simply and comfortably, in a very rapid manner without the use of complicated tools or chip-forming machining.

A further object of the invention is to provide a valve of the aforesaid type in which the valving member stroke and the air gap can be adjusted in a very precise manner.

These objects are attained according to the present invention by a fuel metering valve forming part of an internal combustion engine feed device, comprising a casing in which a path is defined for the fuel, and a valving member mobile axially within the casing between a first position in which it closes said path and a second position in which said path is open, said valving member being operated by an electromagnet disposed in said casing, with said valving member there being rigid an armature arranged for attraction by the core of said electromagnet, and an annular stop member being provided to act as a stop for said valving member when in said second position, said stop member being interposed between a shoulder of said casing and the front surface of a nosepiece rigid with said casing and arranged to house said valving member, characterised in that said stop member is provided, on that side facing said nosepiece, with at least two different flat surfaces, of which a first surface is arranged to form a stop for said valving member and a second surface is arranged to form a shoulder for said front surface of the nosepiece, said first and second surfaces being positioned each at a different distance from said casing shoulder in such a manner that the position of said first surface sets the air gap between said armature and said core to a predetermined value, and the position of said second surface sets the stroke of said valving member in passing from said first to said second position.

BRIEF DESCRIPTION OF THE DRAWINGS

The present invention will be more apparent from the description of one embodiment thereof given hereinafter by way of example with reference to the accompanying drawings, in which.

DETAILED DESCRIPTION OF THE INVENTION

Figure 2:
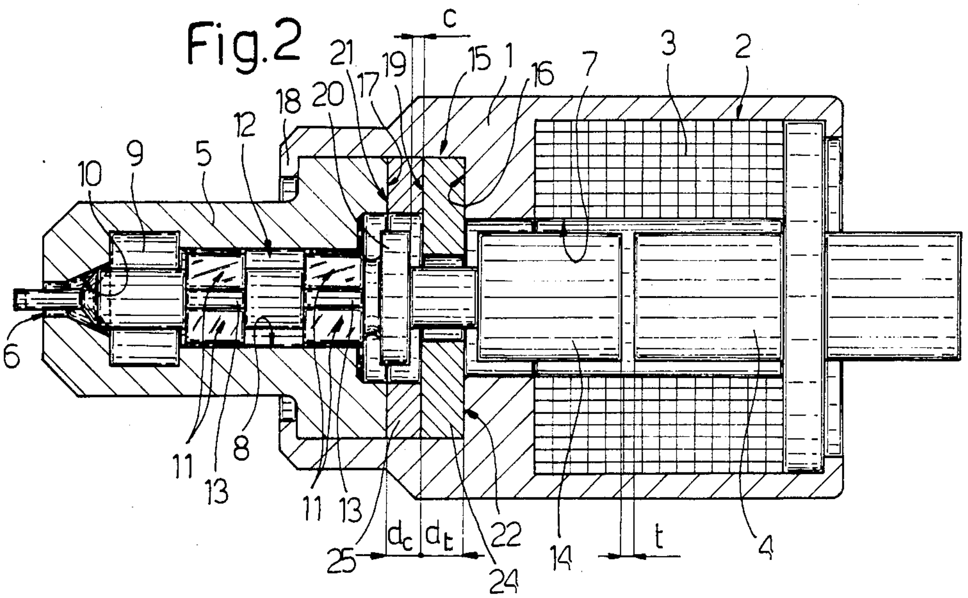
FIGS. 2 and 3 are axial sections through two different embodiments of the valve according to the invention.

The fuel metering valve according to the invention is arranged for incorporation into an internal combustion engine feed device which feeds a mixture of air and fuel into the engine feed manifold.

The valve comprises a casing 1 in which there is housed an electromagnet 2 consisting substantially of a winding 3 and a tubular core 4. To the casing 1 there is fixed a nosepiece 5, the front end of which comprises an axial bore 6 through which the fuel is delivered. In the casing 2 and nosepiece 5 there are provided suitable bores 7 and 8 which are in communication with a front chamber 9 of the nosepiece and define a path for the fuel, which is normally fed into the bore 7 through an axial bore (not shown) provided in the core 4. Inside the nosepiece 5, a seat 10 is provided to form a support for a corresponding valving member 12, which is mobile axially within the bore 8 of the nosepiece 5 and bore 7 of the casing 1. The valving member 12 is conveniently guided by cylindrical surface portions formed on a pair of annular projections 13 which slidingly engage the surface of the bore 8. Flattened portions 11 are provided on these projections to allow fuel passage.

To the rear end of the valving member 12 there is fixed an annular armature 14 arranged for attraction by the core 4 of the electromagnet 2.

According to the invention, the valve comprises a stop member 15 which forms a stop for the valving member 12, and is interposed between a shoulder 16 of the casing 1 and the front surface 17 of the nosepiece 5 so as to be clamped between them. The nosepiece 5 and stop member 15 are fixed on to the casing 1 by turning the front edge 18 of this latter over a flanged part of the nosepiece, as is clearly visible in the figures.

On that side facing the nosepiece 5, the stop member 15 is provided with two different flat surfaces, one of which, indicated by 19, is arranged to form a stop for the collar 20 provided on the valving member, and the second of which, indicated by 21, is arranged to form a shoulder for the front surface 17 of the nosepiece 5. On its opposite side, the stop member 15 comprises only one flat surface 22 which rests on the shoulder 26 of the casing 1.

Figure 1:
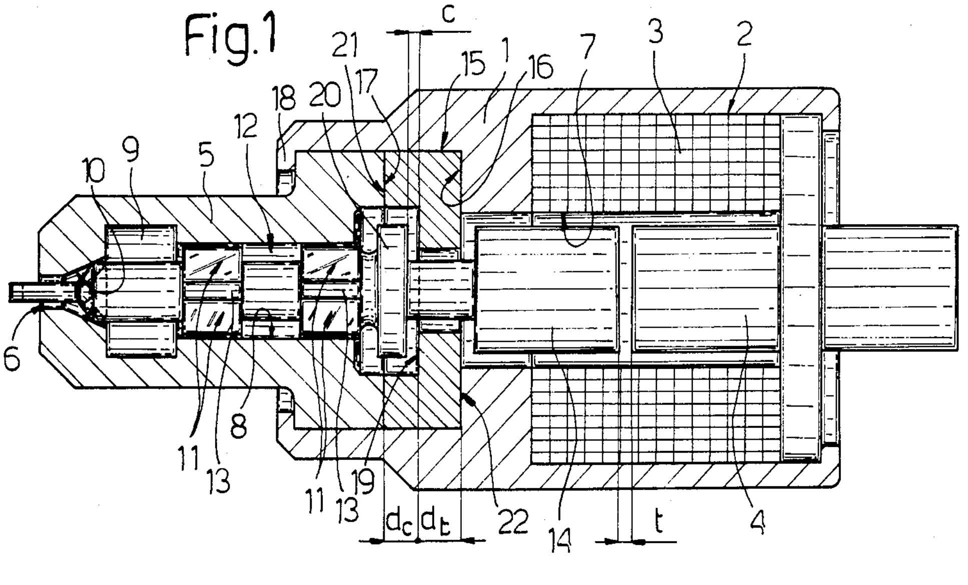
FIG. 1 is an axial section through a first embodiment of a fuel metering valve according to the invention.

In the valve embodiment shown in FIG. 2, the stop member 15 consists of two rings or washers 24, 25 having the same outer diameter but different inner diameters, so that that surface of the first of these rings facing the nosepiece 5 forms the surface 19 acting as the stop for the collar 20, and that surface of the second ring facing the same direction forms the surface 21 against which the front surface 17 of the nosepiece 5 rests. In the valve shown in FIG. 3, the stop member 15 has a different shape from that of the corresponding member of FIG. 1, in that the two surfaces 19 and 21 of said member which face the nosepiece 5 are still at different distances from the shoulder 16, but in contrast to the embodiment of FIG. 1 the first of these surfaces is at a greater distance from said shoulder. The operation of the described fuel metering valve is as follows. The valving member 12 is normally held against the relative seat 10 of the nosepiece 5 by the action of the spring (not shown) interposed between it and the core 4, or in any other equivalent manner. When a predetermined quantity of fuel is to be injected, the electromagnet 3 is energised for a predetermined time period. As a result of the attraction exerted by the core 4 on the armature 14, the valving member 12 separates from the seat 10 and moves axially towards the right in the figures, until its collar 20 rests against the surface 19 of the stop member 15. When in this configuration, in order for the valve to operate correctly, between the core 4 and armature 14 there must be left a residual space (residual air gap) which is usually very small and of a predetermined size. Following the separation of the valving member 12 from the seat 10, the fuel can flow from the chamber 9 through the bore 6. As soon as the electromagnet 3 is deenergised, the valving member is returned to its initial closed position by the action of the said spring.

It is therefore apparent that the valving member effects the stroke c (FIG. 1) in passing from its first closed position to its second open position, in which the collar 20 rests against the surface 19. In addition, when the valving member 12 is in its first position, the distance between the armature 14 and the core 4, this distance being indicated by t in FIG. 1 (initial air gap), is also predetermined and is greater than the stroke c.

The valve according to the invention enables the stroke c and the initial air gap t to be simply and rapidly adjusted with considerable precision in the following manner.

When a valve is to be constructed with defined values of c and t, it is necessary only to mount on said valve a stop member 15 in which the surfaces 19 and 21 have predetermined distances from the shoulder 16. In this respect, as can be clearly seen from FIG. 1, the size of the air gap t depends on the distance $d_t$ from the surface 19 and shoulder 16, and the size of the stroke c depends on the distance $d_c$ between the surfaces 19 and 21. Consequently, the size of the air gap t and stroke c can be adjusted completely independently of each other by choosing a stop member with predetermined values of $d_t$ and $d_c$.

In order to make these adjustments rapidly, some sets of stop members could be prepared for forming various combinations of the dimensions $d_t$ and $d_c$, for example such that predetermined values of $d_c$ correspond to predetermined values of $d_t$. The stop member 15 defining the required combination of t and c would then be found by choosing from these different series.

Figure 3:
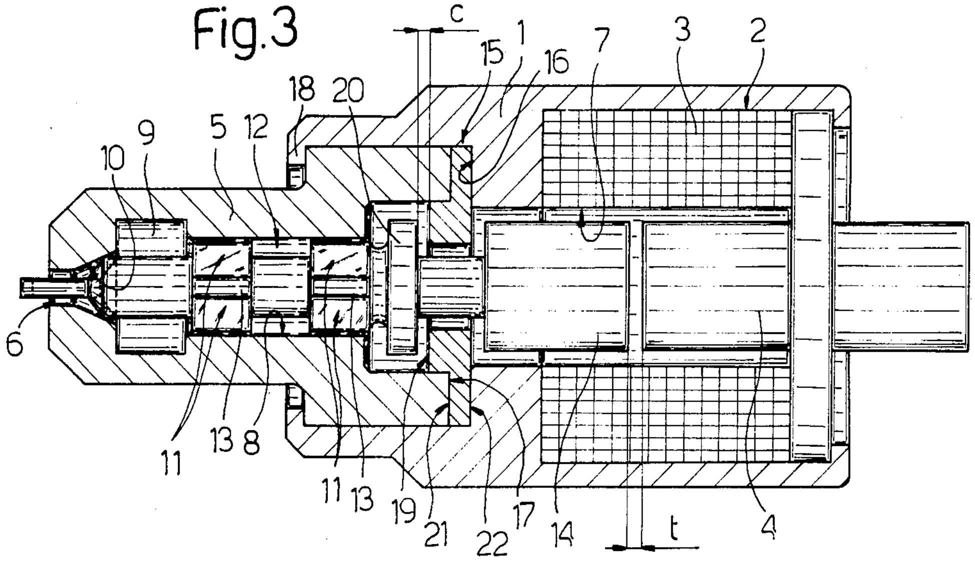

Obviously the same adjustment method can be used, with obvious variations, for the valve of FIG. 3.

The said adjustment methods can be further simplified by using a stop member 15 such as that shown in FIG. 2, i.e. formed from two actual superposed rings or washers 24, 25. In this case, to obtain the required combination of dimensions $d_t$ and $d_c$ it is necessary only to choose two different rings having the said dimensions.

With the valve according to the invention, it is therefore apparent that adjustments to the stroke c and air gap t can be made extremely simply and rapidly, it being necessary only to choose a stop member 15 with the required pair of dimensions $d_t$, $d_c$, there being absolutely no need for machining or adjusting valve parts, as was required in the initially described valves of the prior art. The adjustment can be made in an extremely precise manner because of the considerable precision with which the stop members 15 to be mounted on the valve can be formed and selected.

It is apparent that modifications can be made both to the form and arrangement of the various parts of the described valve, but without leaving the scope of the inventive idea.

We claim:

1. A fuel metering valve for an internal combustion engine fuel feed device, said valve comprising:

a casing defining an enclosure and a shoulder in said enclosure, which casing defines a fuel feed path;

an electromagnet with a core mounted in said enclosure;

a nosepiece with an axial bore and a front surface, which cooperates with said casing shoulder to define a valving member housing;

a valve member operable to control fluid flow through said fuel metering valve, said valve member axially movable between a first position closing said fuel path and a second position opening said fuel path, said valve member having a rigid armature arranged for attraction by said electromagnet core;

an annular stop member mounted and operable in said valving member housing as a valve stop at said valve member second position, said annular stop member having at least a first flat surface and a second flat surface, said first flat surface operable as a stop for said valve member and the second flat surface operable as a shoulder for said nosepiece front surface, said annular stop member including a first annular washer defining a first inner diameter and outer diameter, and a second annular washer defining a second inner and outer diameter, wherein at least one of said first and second inner diameters and first and second outer diameters are unequal, one of said first and second annular washers defining said first flat surface and a flat bearing surface to contact said casing shoulder, and the other of said first and second annular washers defining said second flat surface to contact said nosepiece, which other washer contacts said one washer first flat surface;

said core and said armature cooperating to define an air gap therebetween at said valve member second position, which air gap is a function of the separation between said stop member first flat surface and said shoulder;

said second flat surface separated from said shoulder and contacting said nosepiece at a predetermined distance to define the stroke of said valve member travel from said first position to said second position.

2. A fuel metering valve as claimed in claim 1, wherein said valve member further comprises an annular projection mounted and operable in said valving member housing, said annular projection operable to contact said stop member first surface at said second position.

3. A fuel metering valve as claimed in claim 1 wherein said stop member is an annular ring defining a first side and a second side, said first side having a flat bearing surface to contact said casing shoulder, said second side having said first flat surface and said second flat surface, which surfaces are separated from said flat bearing surface by a first separation distance and a second separation distance, respectively, which first and second distances are unequal.

4. A fuel metering valve as claimed in claim 3 further comprising an annular projection on said valve member to contact said first flat surface and define said valve member second position wherein said air gap is a function of said valve member second position.

5. A fuel metering valve as claimed in claim 3, wherein said second flat surface contacts said nosepiece front surface to define said axial bore position and thus to define said valve member travel stroke between said first position and said second position.

* * * * *